(12) United States Patent
Rist et al.

(10) Patent No.: US 7,006,619 B2
(45) Date of Patent: Feb. 28, 2006

(54) SYSTEM FOR ACCESSING DIFFERENT RESOURCES HAVING THE SAME IDENTIFICATION CODE

(75) Inventors: Claus Rist, Bochum (DE); Otto Schroeter, Essen (DE)

(73) Assignee: Siemens Aktiengesellschaft, Munich (DE)

( * ) Notice: Subject to any disclaimer, the term of this patent is extended or adjusted under 35 U.S.C. 154(b) by 447 days.

(21) Appl. No.: 10/309,347

(22) Filed: Dec. 4, 2002

(65) Prior Publication Data

US 2003/0103495 A1 Jun. 5, 2003

(30) Foreign Application Priority Data

Dec. 5, 2001 (DE) .......................... 101 59 665

(51) Int. Cl.
*H04M 7/00* (2006.01)

(52) U.S. Cl. .............. 379/229; 379/355.07; 379/355.08
(58) Field of Classification Search ................. 379/219, 379/220.01, 221.14, 229, 355.05, 355.07, 379/355.08, 912
See application file for complete search history.

(56) References Cited

U.S. PATENT DOCUMENTS

| | | | | |
|---|---|---|---|---|
| 4,769,834 A | * | 9/1988 | Billinger et al. | 379/115.01 |
| 4,791,665 A | * | 12/1988 | Bogart et al. | 379/221.02 |
| 5,452,353 A | * | 9/1995 | Menezes | 379/355.08 |
| 5,475,743 A | * | 12/1995 | Nixon et al. | 379/355.07 |
| 5,592,542 A | * | 1/1997 | Honda et al. | 379/266.05 |
| 5,915,012 A | * | 6/1999 | Miloslavsky | 379/265.02 |
| 6,292,557 B1 | * | 9/2001 | Gabara | 379/355.08 |
| 6,876,736 B1 | * | 4/2005 | Lamy et al. | 379/211.01 |

FOREIGN PATENT DOCUMENTS

WO   WO 96 27266 A   9/1996

OTHER PUBLICATIONS

Netware Telephony Services Application Programmin Interface (TSAPI) Version 2, Issue 3.0, 1–18, Apr. 1998 (1998–04), Novell Inc., Lucent Technologies Inc.
Standard ECMA–217, Services for Computer Supported Telecommunication Applications (CSTA) Phase II, pages 1–146, Dec. 1994 (1994–12), ECMA.

* cited by examiner

*Primary Examiner*—Bing Q. Bui
(74) *Attorney, Agent, or Firm*—Staas & Halsey LLP

(57) ABSTRACT

A system having at least two communication systems which manage resources in each case, in which in each case an identification code is assigned to the resources for identification, and in which the resources managed by a single communication system can be differentiated on the basis of their identification codes, and having at least one application for controlling and/or monitoring the resources by transmitting messages comprising the identification code of the respective resource between the at least one application and the communication systems, characterized in that an extension of all identification codes is provided for differentiating the resources, which extension is performed at least by every communication system when sending messages and comprises an unambiguous identifier of the sending communication systems, at least whenever a plurality of resources have the same non-extended identification code in each case.

26 Claims, 1 Drawing Sheet

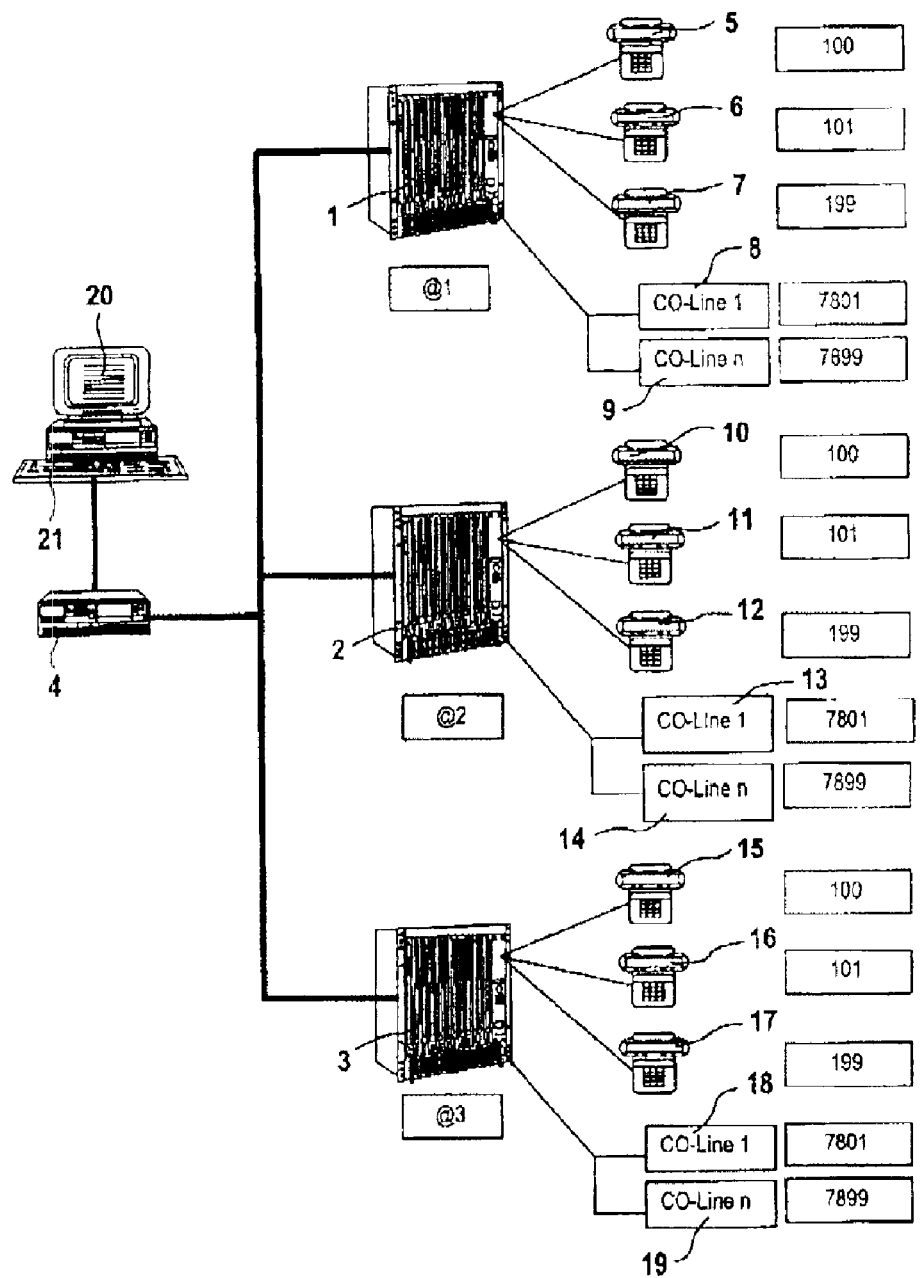

SYSTEM FOR ACCESSING DIFFERENT RESOURCES HAVING THE SAME IDENTIFICATION CODE

CROSS REFERENCE TO RELATED APPLICATIONS

This application is based on and hereby claims priority to German Application No. 101 59 665.0 filed on Dec. 5, 2001, the contents of which are hereby incorporated by reference.

BACKGROUND OF THE INVENTION

Arrangements in which applications installed on computers control and/or monitor the subscribers on communication systems are known as CTI systems (CTI=Computer Telephony Integration). In these arrangements a telephony server, often also termed a CTI server, is connected between the applications and a communication system. There is here a data connection between each communication system and the CTI server as well as a data connection in each case between the various applications and the CTI server. The applications thus do not communicate directly with the communication systems, but with the aid of a CTI server. One often also refers to third-party CTI systems.

The subscribers connected to the communication systems are differentiated from one another on the basis of identification codes. One common identification code here is the extension number, which is always unambiguous for the subscribers of an individual communication system, i.e. exactly one subscriber is assigned to each extension number. Incidentally, this applies not only to subscribers in the traditional sense, that is to say to telephone lines, but also to central office lines, announcement ports, collective lines and the like. The general term 'resource' is used to refer to all these subscribers.

For the control and/or monitoring of resources by applications, messages are transmitted between the applications and the communication system on which the respective resource is being operated. An important part of the messages is always the identification code of the respective resource in order to be able to assign the correct resource to the message, both from the communication system and from the application. The identification code assigned to a resource is also often termed the resource ID (ID= identification). If a plurality of communication systems are connected to a CTI server, the CTI server uses the resource ID to forward a message sent by the application to the particular communication system to which the respective resource is connected. In the reverse direction the CTI server transmits the messages coming from the communication systems to the particular application or to all the applications provided for access to the respective resource. The assignments can be configured in the CTI server. Since the messages of various communication systems are brought together in the CTI server and are transmitted over a single data connection to the respective application or applications, from the point of view of the application this results in a "one system image", i.e. the applications do not differentiate whether the various resources are connected to a single communication system or to various communication systems. Each application differentiates the resources solely on the basis of the resource ID. Since the resource ID is frequently identical to the extension number of the corresponding connection to the communication system, performance of the control and/or monitoring, "call control", is also referred to as "line-based".

On the existing systems it has proved disadvantageous that when controlling and/or monitoring resources of a plurality of communication systems, the resource IDs must be unambiguous not only with respect to a single communication system, but with respect to all communication systems to which such resources are connected. If the resource IDs are formed as usual from the extension numbers, all resources, that is to say also all subscribers of the CTI system, must have unambiguous extension numbers. In CTI systems for communication networks having a plurality of communication systems and having many subscribers, this results in unmanageably long extension numbers.

SUMMARY OF THE INVENTION

One possible object of the invention is, in a system having at least two communication systems whose resources can be controlled and/or monitored by at least one application by messages, to ensure for the users or subscribers that the identification codes (e.g. short extension numbers) which are readily manageable within a communication system can also be retained in the case of a plurality of or the addition of further communication systems.

The solution proposed is that an extension of all identification codes is provided for differentiating the resources, which extension is performed at least by every communication system when sending messages and comprises an unambiguous identifier of the sending communication systems, at least whenever a plurality of resources have the same non-extended identification code in each case.

CTI systems comprising a plurality of communication systems and a plurality of applications can be constructed in a flexible and extensible manner if the communication systems exchange the messages with the at least one application via a telephony server.

The format for transmitting identification codes to applications can be adapted flexibly to the requirements of different applications in that the identifier for extending the messages transmitted from the communication systems to the telephony server is converted by the telephony server into another identifier and is transmitted together with the messages to the at least one application.

Existing applications that differentiate resources solely on the basis of the assigned subscriber number can continue to be used in that the telephony server uses the identifier to transmit to the at least one application the messages provided with an identification code comprising the subscriber number of the resource in international format.

If at least one application is a CTI application (CTI= Computer Telephony Integration), connections of the telephony terminals can be readily established from the applications.

It is possible to realize a wide range of call control functions in that the at least one application exchanges the messages in a data format defined in the TAPI protocol (TAPI=Telephony Application Programming Interface) or CSTA Phase III protocol (CSTA=Computer Supported Telephony Application).

Communication systems and telephony servers from systems such as those described above can also be used in established networks that operate according to known techniques in that the use or non-use of extended identification codes in the telephony server and the communication systems can be selected as an operating mode.

In the case of changes in networks, applications can automatically set the optimum operating state if the ability to use identification codes extended by the identifier can be interrogated on the telephony server or on a communication system by the at least one application and the use of the extension of the identification codes can be turned on and off by the at least one application.

The functionality of systems comprising communication systems, telephony server and applications is provided to a proven extent in that the non-extended identification code of the resource is represented in a data format that corresponds to the SFR format (SFR=Switching Function Representation) of the ECMA-269 standard.

BRIEF DESCRIPTION OF THE DRAWINGS

These and other objects and advantages of the present invention will become more apparent and more readily appreciated from the following description of the preferred embodiments, taken in conjunction with the accompanying drawings of which:

The single FIGURE here shows a schematic representation of a telephony server to which three communication systems are connected, the resources of which have the same extension numbers in each case.

Shown in the FIGURE is a CTI system in an arrangement in which communication systems 1, 2, 3 are connected to a telephony server 4 via a packet-switching network (IP network; IP=Internet Protocol). Connected to the communication systems 1, 2, 3 are resources 5–19, with the resources 5–7, 10–12, 15–17 being telephony subscribers and the resources 8, 9, 13, 14, 18, 19 being central office lines (CO-Line=Central Office Line). In the FIGURE the communication systems 1, 2, 3 are denoted by a serial designation @1–@3 in each case. Areas which comprise a communication system 1, 2, 3 and the assigned resources 5–9, 10–14, 15–19 are also termed communication nodes, and hence the serial designation @1–@3 of the communication systems 1, 2, 3 is also termed the node ID. The extension numbers 100–7899 assigned to the resources 5–19 as identification codes are also entered in the FIGURE.

Furthermore, applications installed on PCs 21 are connected to the telephony server 4 (likewise via an IP network).

By way of example, an application 20 connected to the telephony server 4 is to monitor the subscriber having the extension number 100 which is connected to the communication system 1. The associated resource 5 thus has here the extension number 100 as identification code or resource ID. The monitoring of the resource 5 by the application 20 includes the signaling of a change in status of the subscriber to the application 20, for example when it changes from the free state to the busy state.

For this purpose, first of all monitoring of the resource 5 is started in the communication system 1. This is also referred to as "setting a monitoring point" and the process is analogously referred to as "monitoring". To set the monitoring point for the resource 5 in the communication system 1, the application 20 transmits a message to the telephony server 4. The message comprises an identifier which indicates which of the resources 5–19 of the communication system 1 is to be monitored. The application 20 transmits as identification code the complete subscriber number of the resource 5 in international format, which comprises a country code, an area code, a system subscriber number and the extension number 100 of the resource 5. This format of the complete international subscriber number is also called the canonical number format. On the basis of the information contained in the complete subscriber number in canonical format, the telephony server 4 differentiates in which of the communication systems 1, 2, 3 the monitoring point needs to be set. This is necessary because the extension number 100 is simultaneously assigned to a plurality of resources 5, 10, 15 of different communication systems 1, 2, 3 (overlapping extension numbers). The assignment of the location information for the communication systems 1, 2, 3 implicitly contained in the subscriber numbers in canonical format can be evaluated in the telephony server 4 by reference to a table. The telephony server 4 now establishes a connection to the communication system 1, transmits the message that a monitoring point should be set and extends this message with the resource ID 100, which in this communication system 1 represents the unambiguous identification code for the resource 5. The monitoring operation for the telephony subscriber having the extension number 100 is thus started.

As soon as the status of the resource 5 changes, for example in the event of an incoming call, the communication system 1 generates a message to that effect. In addition to a character string describing the status change, the message comprises the identification code of the resource 5. Initially, the identification code is identical to the extension number of the resource 5, that is to say 100. For transmission of the message, the identification code is extended by the node ID of the communication system 1, which is designated by @1. The message extended in this way is now transmitted to the telephony server 4. There, by reference to the table described above, the extended identifier is converted into a subscriber number according to the canonical format which is unambiguous throughout the entire communication network and is sent together with the information about the status change of the resource 5 to the particular application 20 that previously initiated the setting of the monitoring point in the communication system 1. In the telephony server 4, on each setting of monitoring points a list is updated in which it is recorded which resources 5–19 on what communication systems 1, 2, 3 are being monitored by which applications. It is thus possible to transmit messages sent from the communication systems 1, 2, 3 to the telephony server 4 always to the right application(s).

The fact that the resources 10, 15 in the communication network also use the extension number 100 as identification code does not lead to any misdirection.

It is possible to connect to the telephony server 4 not only applications 20 that use the subscriber numbers to differentiate resources 5–19, that is to say perform line-based call control, but also applications that are already prepared for the management of resources 5–19 on a plurality of communication systems 1, 2, 3 having overlapping subscriber numbers. The extended identification codes of messages that the telephony server 4 transmits to such applications are not converted into a complete subscriber number according to the canonical format, but the application itself handles the separate management of resource ID and node ID. Nevertheless it may also be necessary for the operation of such applications that the telephony server 4 converts the node ID of the communication system 1, 2, 3 into a different string of digits or characters. This is the case when the information is transmitted over the communication node between the application and the telephony server 4 in a data format different from the data format used for transmitting the information between the telephony server 4 and the communication systems 1, 2, 3.

During the first start-up of the telephony server 4, or after every change in the topology of the communication network, with the aid of a special function the telephony server 4 interrogates a data record in each connected communication system 1, 2, 3 which indicates which functionality with respect to call control is supported by each of the communication systems 1, 2, 3. If all communication systems 1, 2, 3 support the method for extending the identification code, that is to say the resource ID, by a node ID, the use of this method in all communication systems 1, 2, 3 and the telephony server 4 is turned on. This is the prerequisite for the ability to use resources 5–19 having identical identification codes, also known as "overlapping resource IDs" on various communication systems 1, 2, 3. The minimum length of the extension numbers is consequently not dependent on the total number of subscribers in the communication network, but only on the number of subscribers in the respective communication system 1, 2, 3.

The invention has been described in detail with particular reference to preferred embodiments thereof and examples, but it will be understood that variations and modifications can be effected within the spirit and scope of the invention.

What is claimed is:

1. A system comprising:
   a plurality of resources;
   at least two communication systems, each of which manages a plurality of resources, each communication system identifying and differentiating the resources associated therewith on the basis of identification codes assigned to the resources;
   an application for communicating with the resources via messages, each message comprising the identification code assigned to the resource to which communication is intended, the messages being communicated between the application and the communication systems; and
   extension units provided respectively in the communication systems, to add extensions to the identification codes at least whenever a plurality of resources have the same identification code, the extension being added at least for messages transmitted to the application to uniquely identify the communication system transmitting the message.

2. The system as claimed in claim 1, wherein the communication systems exchange the messages with the application via a telephony server.

3. The system as claimed in claim 2, wherein
   the telephone server is interposed between the application and the communication systems such that messages for the application are transmitted from the communication systems to the telephone server, and
   the telephony server has a conversion unit for the messages transmitted from the communication systems to the telephony server, to convert extensions associated with the messages into identifiers that are transmitted together with the messages to the application.

4. The system as claimed in claim 3, wherein the application comprises:
   an interrogation unit to determine whether the communication systems contain extension units and determine whether the telephony server contains a conversion unit; and
   a control unit to activate and deactivate the extension unit and the conversion units remotely from the application.

5. The system as claimed in claim 3, wherein the telephony server uses the identifier to transmit the messages to the application in international format with a subscriber number for the resource.

6. The system as claimed in claim 3, wherein at least one of the extension units of the communication systems and the conversion unit of the telephony server is switchable between using extensions and not using extensions.

7. The system as claimed in claim 5, wherein the application is a Computer Telephony Integration application.

8. The system as claimed in claim 7, wherein the application exchanges messages in a Telephony Application Programming Interface data format.

9. The system as claimed in claim 8, wherein at least one of the extension units of the communication systems and the conversion unit of the telephony server is switchable between using extensions and not using extensions.

10. The system as claimed in claim 9, wherein the application comprises:
    an interrogation unit to determine whether the communication systems contain extension units and determine whether the telephony server contains a conversion unit; and
    a control unit to activate and deactivate the extension units and the conversion unit remotely from the application.

11. The system as claimed in claim 7, wherein the application exchanges messages in a Computer Supported Telephony Application Phase III data format.

12. The system as claimed in claim 11, wherein at least one of the extension units of the communication systems and the conversion unit of the telephony server is switchable between using extensions and not using extensions.

13. The system as claimed in claim 12, wherein the application comprises:
    an interrogation unit to determine whether the communication systems contain extension units and determine whether the telephony server contains a conversion unit; and
    a control unit to activate and deactivate the extension units and the conversion unit remotely from the application.

14. The system as claimed in claim 1, wherein the application is a Computer Telephony Integration application.

15. The system as claimed in claim 1, wherein the application exchanges messages in a Telephony Application Programming Interface data format.

16. The system as claimed in claim 1, wherein the application exchanges messages in a Computer Supported Telephony Application Phase III data format.

17. The system as claimed in claim 1, wherein the application comprises:
    an interrogation unit to determine whether the communication systems respectively contain extension units; and
    a control unit to activate and deactivate the extension units remotely from the application ability to use identification codes (100–7899) extended by the identifier (@1, @2, @3) can be interrogated on the telephony server (4) or on a communication system (1, 2, 3) by the at least one application (20) and the use of the extension of the identification codes (100–7899) can be turned on and off by the at least one application (20)].

18. The system as claimed in claim 1, wherein the identification codes of the resources are in a Switching Function Representation data format of standard ECMA-269.

19. The system as claimed in claim 1, wherein an extension is added to all of the identification codes contained in the messages transmitted to the application.

20. The system as claimed in claim 1, wherein whenever a plurality of resources have the same identification code, an extension is added for messages transmitted to the application and for messages transmitted to the communication systems.

21. The system as claimed in claim 1, wherein an extension is added to all of the identification codes contained in the messages transmitted to the application and to all of the identification codes contained in the messages transmitted to the communication systems.

22. The system as claimed in claim 1, wherein the application controls the resources.

23. The system as claimed in claim 22, wherein the application monitors the resources.

24. The system as claimed in claim 1, wherein the application monitors the resources.

25. The system as claimed in claim 1, wherein there are a plurality of applications.

26. The system as claimed in claim 1, wherein each communication system manages resources having identification codes that uniquely identify the resources managed by the communication system.

* * * * *

UNITED STATES PATENT AND TRADEMARK OFFICE
CERTIFICATE OF CORRECTION

PATENT NO.        : 7,006,619 B2
APPLICATION NO.   : 10/309347
DATED             : February 28, 2006
INVENTOR(S)       : Claus Rist et al.

It is certified that error appears in the above-identified patent and that said Letters Patent is hereby corrected as shown below:

On the Title Page, item (56), References Cited, Other Publications, column 2, line 1, change "Programmin" to --Programming--

On the Title Page, item (56), References Cited, Other Publications, column 2, line 5, change "Telecommunication" to --Telecommunications--

Column 3, line 31, after "comprise", delete "a"

Column 3, line 32, delete "system" to --systems--

Column 4, line 58, delete "system" to --systems--

Column 5, line 2, "system" to --systems--

Column 5, line 15, "system" to --systems--

Column 6, line 58, change "(20)]." to --(20).--

Column 8, line 5, change "are" to --is--

Signed and Sealed this

Tenth Day of October, 2006

JON W. DUDAS
*Director of the United States Patent and Trademark Office*